Jan. 22, 1952     F. P. JENTSCH     2,583,104
BLOCK MOLDING MACHINE

Filed Nov. 15, 1948     4 Sheets-Sheet 1

INVENTOR
Fred P. Jentsch
By Walter P. Guyer
ATTORNEY

Jan. 22, 1952 F. P. JENTSCH 2,583,104
BLOCK MOLDING MACHINE
Filed Nov. 15, 1948 4 Sheets-Sheet 2
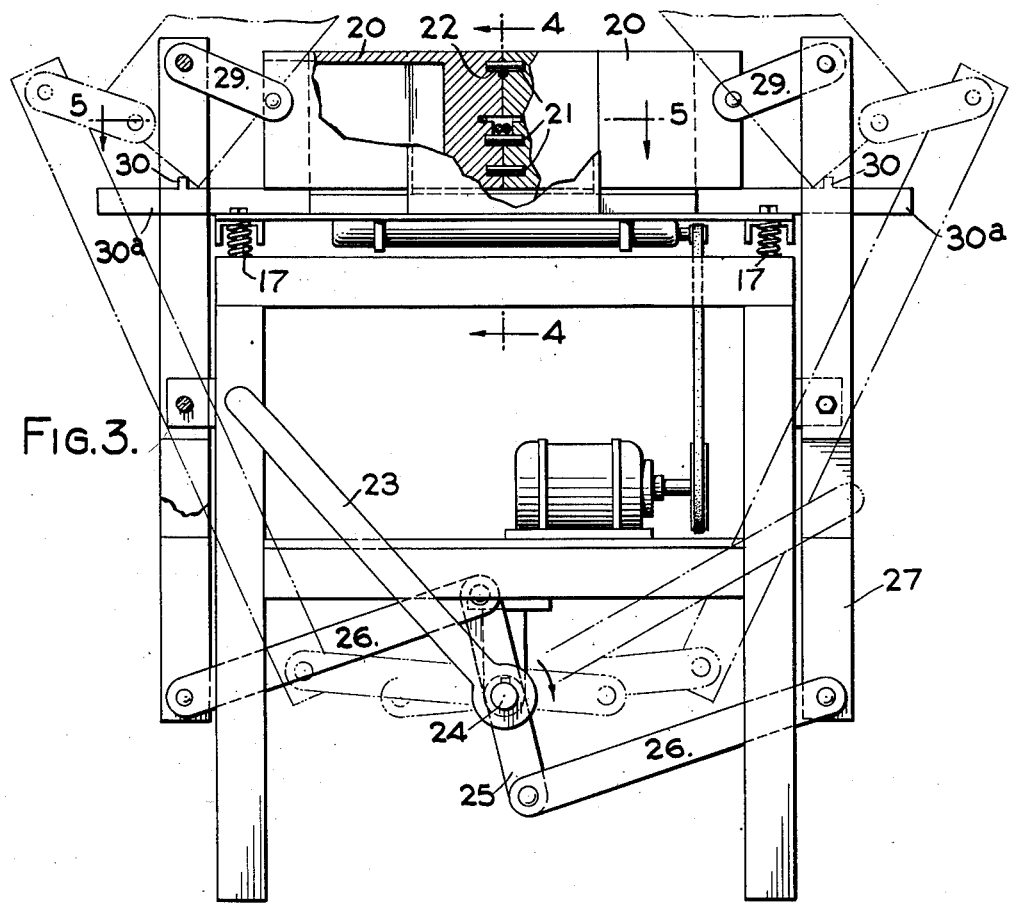
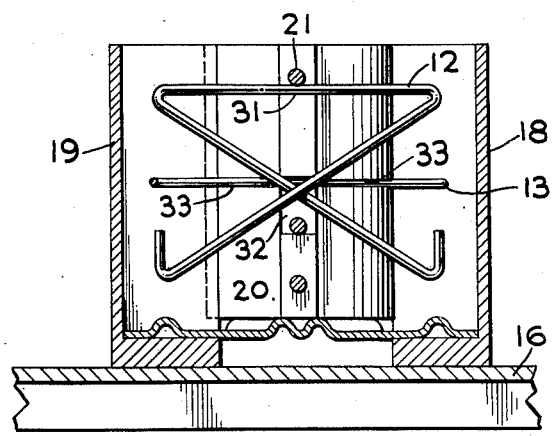
INVENTOR
Fred P. Jentsch
BY Walter P. Geyer
ATTORNEY.

Jan. 22, 1952  F. P. JENTSCH  2,583,104
BLOCK MOLDING MACHINE
Filed Nov. 15, 1948  4 Sheets-Sheet 3

INVENTOR
Fred P. Jentsch
BY Walter P. Guyer
ATTORNEY

Jan. 22, 1952  F. P. JENTSCH  2,583,104
BLOCK MOLDING MACHINE
Filed Nov. 15, 1948  4 Sheets-Sheet 4
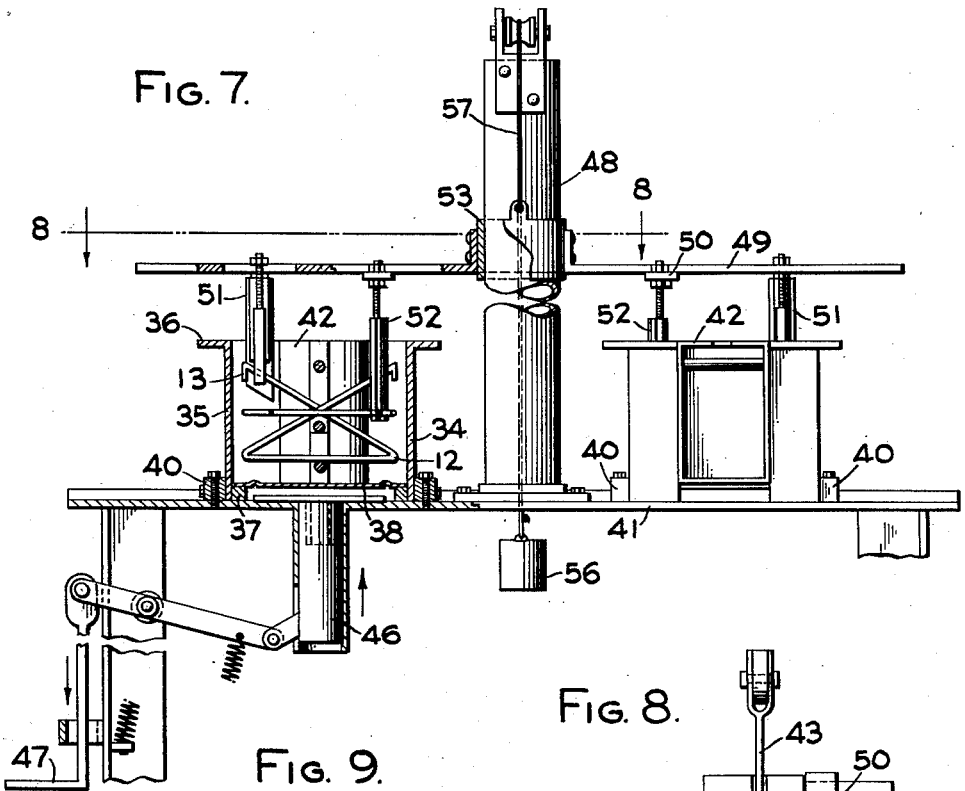
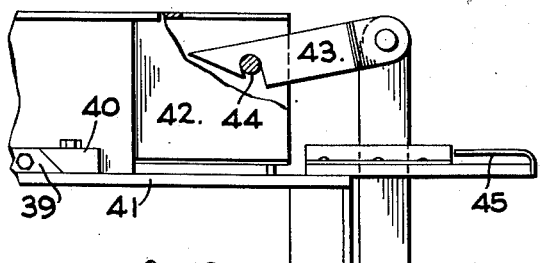
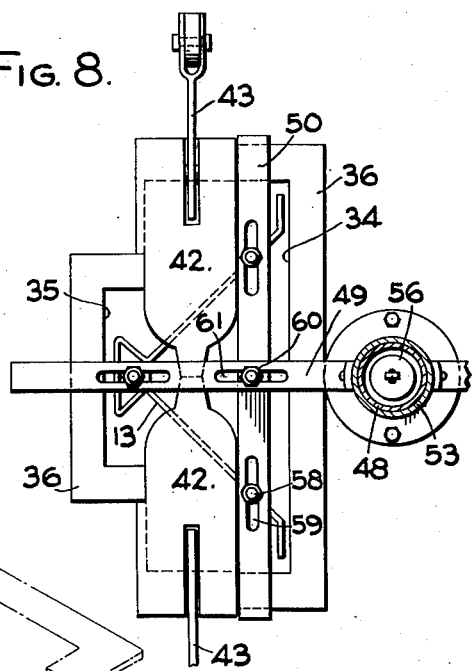
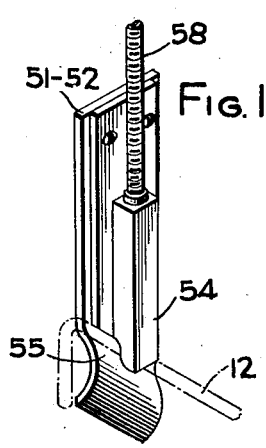
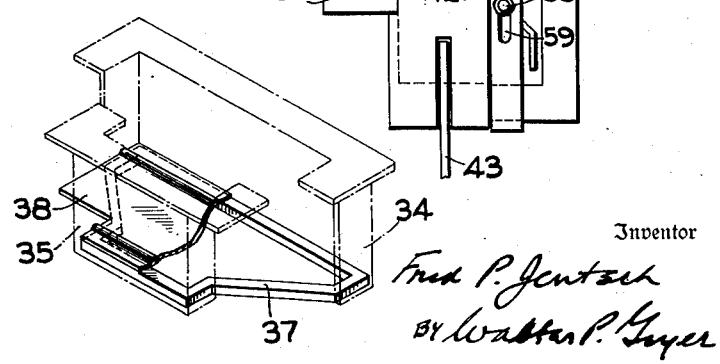
Inventor
Fred P. Jentsch
By Walter P. Guyer
Attorney Patented Jan. 22, 1952

2,583,104

UNITED STATES PATENT OFFICE 2,583,104

BLOCK MOLDING MACHINE

Fred P. Jentsch, Buffalo, N. Y.

Application November 15, 1948, Serial No. 60,123

9 Claims. (Cl. 25—41)

This invention relates to certain new and useful improvements in machines for molding building blocks from concrete and like material.

It has for one of its objects to provide a machine of this character which is so designed and constructed as to facilitate the manufacture of a molded building block characterized as composed of inner and outer spaced block sections joined by transverse tie or coupling members, and wherein a novel mold and core assembly is provided for producing the blocks in an efficient manner.

Another object of the invention is to provide a block-molding machine having relatively movable or adjustable mold and core sections including means for properly and releasably supporting the tie members of the block during the molding operation.

Other features of the invention reside in the construction and arrangement of parts hereinafter described and particularly pointed out in the appended claims.

Figure 1:
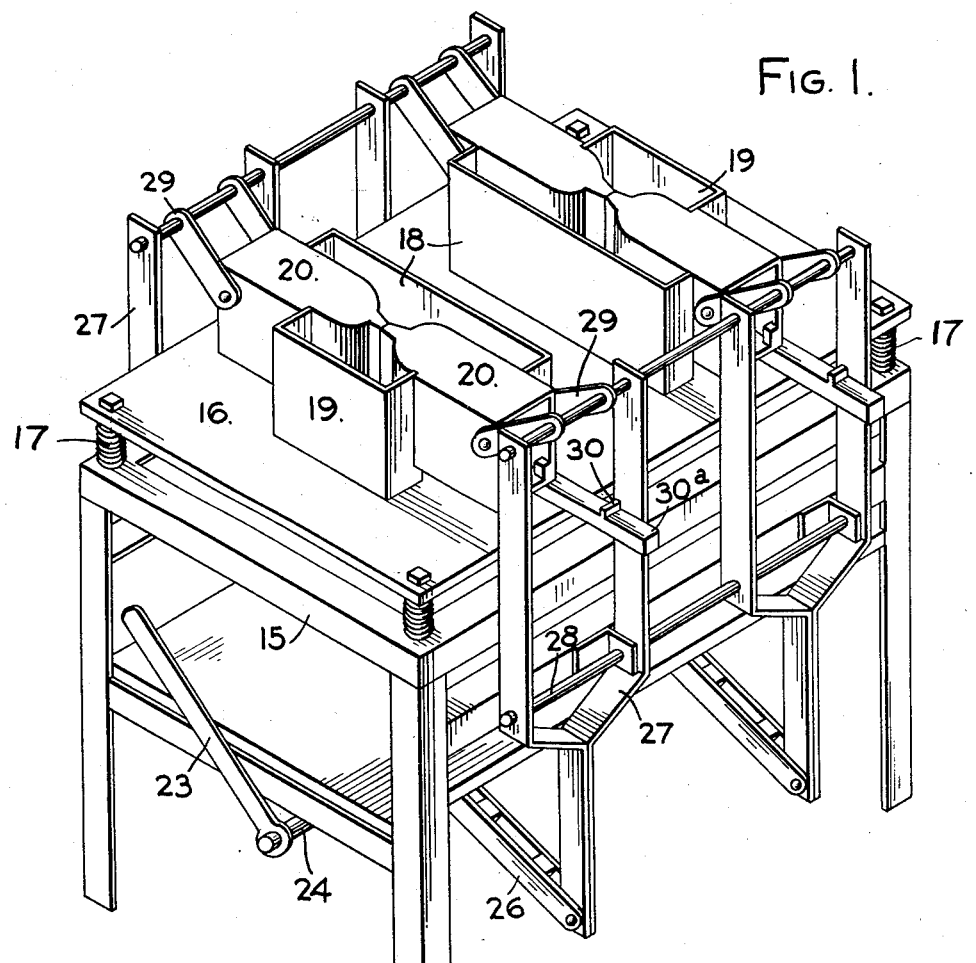
Figure 2:
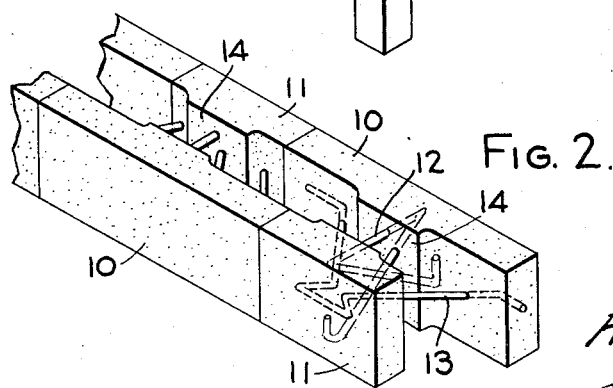
Figure 5:
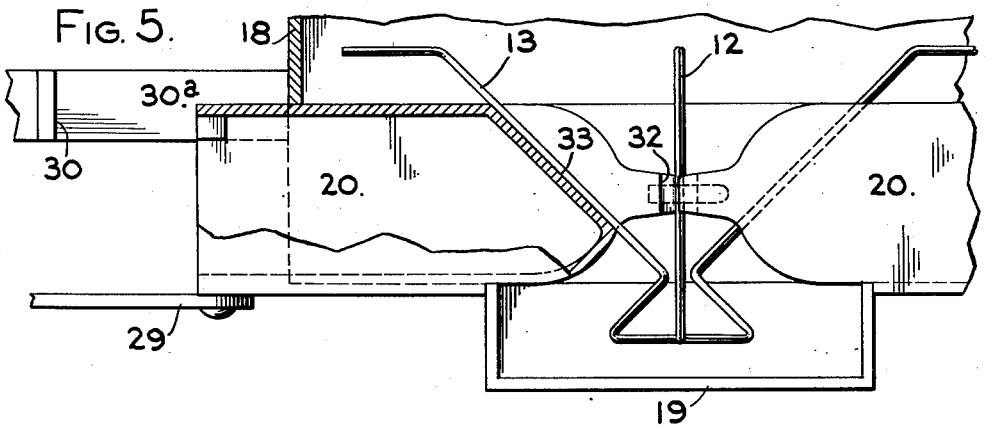
Figure 6:
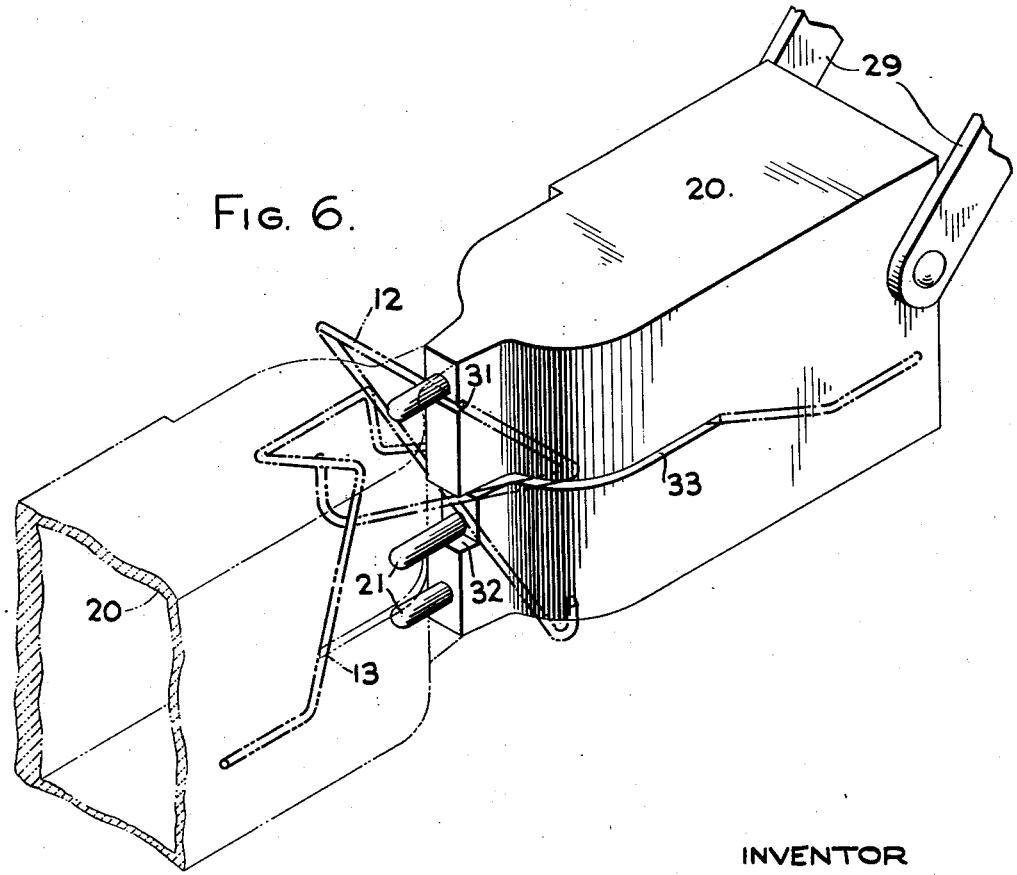

In the accompanying drawings:

Figure 1 is an isometric view of one form of block-molding machine embodying my invention. Figure 2 is a fragmentary isometric of a wall composed of blocks made by such machine. Figure 3 is an end view of the machine, partly in section. Figure 4 is an enlarged fragmentary cross section taken on line 4—4, Figure 3. Figure 5 is an enlarged fragmentary cross section taken on line 5—5, Figure 3. Figure 6 is an isometric view of one of the movable core sections showing the manner of supporting the tie members for molding with the block-sections. Figure 7 is a fragmentary sectional front view of a modified form of the machine utilizing detachable molds and an overhead adjustable tie wire support for facilitating the assembly of the wires in the molds. Figure 8 is a fragmentary horizontal section taken on line 8—8, Figure 7. Figure 9 is a fragmentary side view, partly in section, of one of the removable molds and its companion retractible core member. Figure 10 is an isometric of the base frame of one of the molds with a portion of the mold plate resting thereon and with the mold-sections shown by dot-dash lines. Figure 11 is a detached isometric view of one of the pendant supports for releasably attaching a tie wire thereto.

Similar characters of reference indicate corresponding parts throughout the several views.

My molding machine has been particularly designed for the production of blocks made from concrete or like moldable material and each composed of parallel slabs or sections 10, 11 connected in laterally-spaced relation into a unit structure by open work or lattice-like tie or coupling members 12, 13 embedded at their free ends in the companion sections during the molding of the blocks. The tie member 12 is disposed vertically and bent and crossed upon itself in X-like or figure-8 fashion to provide both diagonal and transverse struts, while the companion tie member 13 is horizontally disposed and is substantially V-shape in plan with the legs thereof extending in oblique fashion and the free ends thereof embedded adjacent the outer portions of one block-section and with the vertex thereof embedded in the central portion of the companion block-section. At their opposing inner faces each block-section has a central boss or projection 14.

Referring now to the machine for making these blocks, it preferably consists of a mold-supporting frame or table 15 including a vibratory top or platform 16 supported thereon by springs 17 and adapted to be vibrated in any well known manner to cause the proper settling or tamping of the concrete into the molds. Applied to the top side of this platform are a plurality of block-molding units, each consisting of complemental mold sections 18 and 19, of substantially U-shape, disposed in opposing laterally spaced relation and of a shape or contour to define the outer side faces and ends of the companion block-slabs or sections 10, 11. Guided for opposing endwise horizontal movement between these laterally-spaced mold sections and forming a longitudinal partition therebetween are core members 20, 20 which are of a shape or contour to define the inner side faces of the block sections and their central bosses 14. The inner end of one of the core members has dowel pins 21 thereon for engaging registering openings 22 formed in the opposing end of the companion core member in the contracted or abutting positions of such members, as shown in Figures 1 and 3.

The actuation of the core members 20, 20 toward and from each other, for the purpose of effecting the assembly of the tie members 12, 13 in their proper relative positions in the mold preparatory to pouring the concrete therein for molding the blocks, is preferably accomplished by a vertically-swinging hand lever 23 fixed on a horizontal shaft 24 journaled in the lower portion of the table 15 and having a double-armed crank 25 thereon connected by opposing links 26 to the lower ends of companion vertically-swinging rock levers 27 pivoted intermediate their ends at 28 to opposite sides of the table and joined at their upper ends by links 29 to the companion core members. Upon shifting the hand lever in the direction of the arrow shown in Figure 3, the core members are retracted more or less to provide sufficient space for the assembly of the tie members, or to the fully retracted position shown by dot-dash lines in Figure 3, wherein each core member, upon striking an abutment 30 formed on a guide bar 30ᵃ mounted on the platform 16, is caused to tilt upwardly and outwardly clear of the mold sections 18, 19.

The core members 20 also serve as releasable supports for the wire-like tie members 12, 13 while pouring the concrete to imbed the same within the molded blocks, and to this end the inner end or face of one of the core members has upper and lower horizontal notches or recesses 31 and 32, respectively, in which the companion transverse and crossed portions of the tie member 12 are seated, as shown in Figures 4 and 6, to effectually support it in its vertical position in the closed or contracted position of the core members. The companion tie member 13 is similarly supported in diagonally-extending horizontal notches 33 provided in the opposing ends of the core members with the diverging legs of such tie member seated therein, as seen in Figure 5. By this construction, it will be observed that the tie members are symmetrically supported and that their opposite ends project about midway into the cavities formed by the mold sections 18, 19. In this assembled position of the parts, the molds are ready for receiving the concrete or other moldable material.

Instead of molding the blocks in the manner just described, the mold sections and their core members may be detachably mounted on the table for the purpose of assembling the tie members in their proper positions relative thereto, after which the complete mold assembly can be removed from the table and delivered to a concrete pouring and vibrating unit for filling the molds and subsequently returning them to the table, withdrawing the core members from the mold sections and finally removing the molded slab sections from the molds. For this purpose, the complemental mold sections 34, 35 are flanged along their top edges, as indicated at 36, and are secured as a unit along their bottom edges to a multi-sided, loop-like base or support 37 on which the pallet plate 38 of the mold is adapted to rest. At its lower outer side, each mold section has a wedge-shaped clamping lug or cleat 39 secured thereto for detachably hold-down engagement with a companion, opposing cleat 40 secured to the table 41, so that upon placing the mold unit on the table and shifting it endwise, the cleats will be wedged together and retain the mold against displacement. The manipulation of the core members 42 to and from their operative closed positions within the mold unit may be effected as heretofore described, with the exception that the toggle link 43 of the actuating assembly is in the form of a latch for detachable connection to a companion coupling pin 44 applied to each core member. A stop in the form of a hook-shaped element 45 is applied to the opposite ends of the table in the line of travel of and for engagement by the companion core members for limiting their outward displacement and for preventing their tipping upwardly during their initial inward movement. These core members are preferably hollow and open at their outer ends with the bottom wall thereof adapted to engage the companion stop 45.

After filling the molds, they are returned to the table for removing the molded blocks. For the purpose of ejecting them from the molds, I provide a vertically-displaceable plunger 46 guided on the table beneath the mold plates and each actuated by a foot pedal 47, so that upon depressing the latter the companion plunger is elevated to lift the blocks from the mold-sections.

For the purpose of facilitating the assembly of the wire tie members 12, 13 in their proper positions on the core members 42, I provide an upright post 48 rising from the table 41 between adjoining molding units and having an elevating frame preferably consisting of crossed arms 49, 50 guided for vertical movement thereon. Suspended from these frame-arms are pairs of spaced tie member supports 51, 52 to which the tie members are detachably connected for presentation into the mold cavities and in the registering planes of the respective core member notches 31, 32 and 33. The frame-arms 49 extends radially from a collar 53 guided for vertical movement on the post 48 and carries the supports 51 for the X-shaped tie members 12, while the frame-arm 50 is attached to the companion frame-arm substantially midway thereof and at right angles thereto and carries the supports 52 for the V-shaped tie members 13. Each of these supports includes a fixed jaw 54 and a yieldable jaw 55 between which the end portions of the tie members are releasably clamped. The elevating frame is adapted to be raised and lowered by hand and it is normally held in an elevated position clear of the mold units by a counterweight 56 connected by a pulley-guided cable 57 to the collar 53. The supports 51, 52 are mounted for vertical and horizontal adjustment on their companion frame-arms by attaching bolts 58 engaging slots 59 in such arms and the frame-arm 50 is similarly connected by a bolt 60 and slot 61 to the companion radial arm 49 to adapt the assembly to different sized block-molds and to permit the adjustment of the supports to extend into the cavities of such molds when the elevating frame is lowered into position for assembling the tie members in their proper relative positions between the ends of the abutting core members 42.

After the tie members 12, 13 are thus properly set, the elevating frame 49, 50 is raised to receive another set of tie members and the mold assembly including the mold-sections 34, 35 and the core members 42, upon the release of the toggle links 43 therefrom, are bodily lifted from the table 41 and delivered to a filling machine which pours the concrete into the molds while subjecting the latter to vibration. Thereafter, the mold assembly is returned to the table 41, the toggle links 43 are coupled to the core members and the latter withdrawn from the mold sections and free of the tie members which are now embedded at their ends in the molded block. The foot pedal 47 is then depressed to elevate the mold plate 38 and the molded blocks free of the mold sections and the finished blocks are then removed and placed on suitable racks to set and dry.

I claim as my invention:

1. A machine for molding concrete blocks, comprising a supporting frame, complemental mold sections disposed in a relatively fixed position thereon and of substantially U-shape in plan with their opposing edges in laterally-spaced relation to define an endwise-opening, longitudinal core passage, opposing core members guided for endwise movement in the passage between said mold sections and forming a longitudinal partition therebetween in their contracted closed position and means operatively connected to said core members for moving them to and from their closed position.

2. A machine for molding concrete blocks, comprising a supporting frame, complemental mold sections disposed in a relatively fixed position thereon and of substantially U-shape in plan with their opposing edges in laterally-spaced relation to define an endwise-opening, longitudinal core passage, opposing core members guided for endwise movement in the passage between said mold sections and forming a longitudinal partition therebetween in their contracted closed position, means operatively connected to said core members for moving them to and from their closed position, and complementary, detachably-engageable cleats applied to the frame and to the mold sections for holding the latter downward onto the frame and against shifting relatively thereto.

3. A machine for molding concrete blocks, comprising a supporting frame, complemental mold sections disposed in laterally-spaced relation on said frame, opposing core members movably guided for endwise and tilting movement in the space between said mold sections and forming a longitudinal partition therebetween in their contracted closed position, and means operatively connected to said core members for moving them to and from their closed position and for governing their tilting movements into and outwardly clear of the mold sections.

4. A machine for molding concrete blocks, comprising a supporting frame, complemental mold sections disposed in laterally-spaced relation on said frame, opposing core members movably guided for endwise and tilting movement in the space between said mold sections and forming a longitudinal partition therebetween in their contracted closed position, rock levers fulcrumed at opposite sides of said frame in the operating plane of the core members, links operatively connecting one end of said levers with the opposing outer ends of the companion core members, abutments mounted on said frame outwardly of said mold sections and in the path of outward movement of the lower ends of said core members, and an actuating lever operatively connected to the other ends of said rock levers.

5. A machine for molding concrete blocks, comprising a supporting frame, complemental mold sections disposed in laterally-spaced relation on said frame, and opposing core members movably guided for endwise movement in the space between said mold sectons and forming a longitudinal partition therebetween in their contracted closed position, said mold sections being substantially U-shaped in plan and including a supporting base-rim having parallel sides and end portions to which such sections are secured as a unitary assembly.

6. A machine for molding concrete blocks, comprising a supporting frame, complemental mold sections disposed in laterally-spaced relation on said frame, and opposing core members movably guided for endwise movement in the space between said mold sections and forming a longitudinal partition therebetween in their contracted closed position, said mold sections being substantially U-shaped in plan and including a supporting base-rim having parallel sides and end portions to which such sections are secured as a unitary assembly, and a molding plate removably fitted in the bottom of the unitary mold assembly in supporting engagment with sad base-rim.

7. A machine for molding concrete blocks, comprising a supporting frame, complemental mold sections disposed in laterally-spaced relation on said frame, opposing core members movably guided for endwise movement in the space between said mold sections and forming a longitudinal partition therebetween in their contracted closed position, the opposing ends of said core members having means thereon for releasably supporting tie members adapted to span the space between the mold sections and to be embedded at their ends in the molded block, and means surmounting said frame for movement toward and from the same and having pendant devices thereon for releasably supporting the tie members thereon for assembly in the mold sections and between the core members.

8. A machine for molding concrete blocks, comprising a supporting frame, complemental mold sections disposed in laterally-spaced relation on said frame, opposing core members movably guided for endwise movement in the space between said mold sections and forming a longitudinal partition therebetween in their contracted closed position, the opposing ends of said core members having means thereon for releasably supporting tie members adapted to span the space between the mold sections and to be embedded at their ends in the molded block, certain of such means being disposed to support a tie member in an upright position and other of such means being disposed to support a second tie member in a horizontal position, and vertically-adjustable means surmounting said frame including arms disposed at substantially right angles to each other and each having spaced supports thereon for releasably clamping the ends of the respective upright and horizontal tie members thereon during their assembly in the mold sections and between the core members.

9. A machine for molding concrete blocks, comprising a supporting frame, complemental mold sections disposed in laterally-spaced relation on said frame, opposing core members movably guided for endwise movement in the space between said mold sections and forming a longitudinal partition therebetween in their contracted closed position, the opposing ends of said core members having means thereon for releasably supporting tie members adapted to span the space between the mold sections and to be embedded at their ends in the molded block, certain of such means being disposed to support a tie member in an upright position and other of such means being disposed to support a second tie member in a horizontal position, and vertically-adjustable means surmounting said frame and including an arm disposed in a plane transversely of the mold sections at the meeting ends of the core members and a second arm disposed lengthwise of the mold sections substantially in a plane at one side of the core members, and tie member supports mounted in spaced pendant relation on said respective arms.

FRED P. JENTSCH.

REFERENCES CITED

The following references are of record in the file of this patent:

UNITED STATES PATENTS

| Number | Name | Date |
|---|---|---|
| 899,168 | Jaeger | Sept. 22, 1908 |
| 937,885 | Sterling | Oct. 26, 1909 |
| 1,258,344 | Kenny et al. | Mar. 5, 1913 |
| 1,294,311 | Seiferd | Feb. 11, 1919 |